Patented July 25, 1944

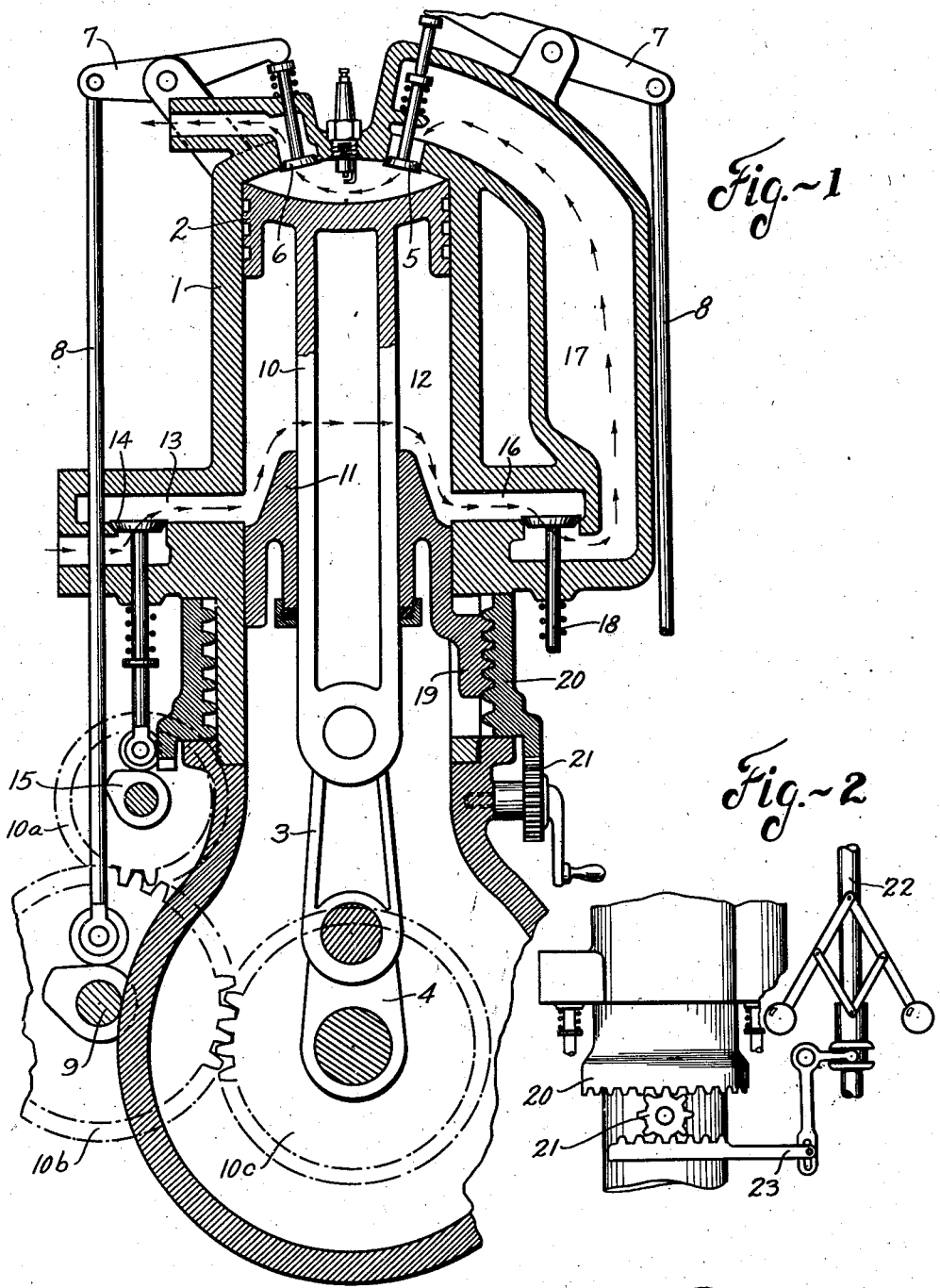

2,354,357

UNITED STATES PATENT OFFICE 2,354,357

ENGINE

Walter L. Barthelemy, Dayton, Ohio

Application November 20, 1942, Serial No. 466,259

19 Claims. (Cl. 123—75)

This invention pertains to internal combustion engines, and more particularly to a supercharging system therefor, and to the fuel charges prior to admission into the engine cylinder and the regulation of the degree of precompression.

In the present embodiment of the invention there is contemplated two stage compression of fuel for a four cycle engine, the ultimate comfuel for which is variable in accordance with the engine speed and fuel requirements.

In operation of a conventional four cycle engine upon the intake stroke when starting or at low speed, an ample charge of fuel gas is drawn into the cylinder to fill the vacuum created by the piston movement. However, as the engine speed increases, due to inertia of the fuel gas, the rate of flow thereof under influence of engine suction remains substantially constant or accelerates but little while the open period of the intake valve decreases. Consequently, during the decreased intake time interval incident to accelerated piston speed, a less quantity of fuel gas will enter the cylinder and the latter will not be completely filled with gas, and a lesser charge will be compressed on the return stroke of the piston.

To accelerate the fuel gas movement into the cylinder during the decreased time interval that the intake valve remains open, the gas is precompressed whereby the velocity is increased and the charge amplified by conjoint influence of the engine suction and expansion of the precompressed fuel gas. However, it is undesirable that such supercharging be effected while starting the engine or when operating at low speed when such acceleration is unnecessary and an ample charge will be taken in under engine suction alone. Therefore, in the present instance regulatory means is provided by which the degree of precompression may be varied, either manually or automatically under influence of changing engine speed.

The object of the invention is to improve the construction as well as the means and mode of operation of internal combustion engines, and provide supercharging means therefor, whereby such supercharged engines may not only be economically manufactured and operated, but will be more efficient in use, automatic in operation, uniform in action, having relatively few operating parts, and be unlikely to get out of repair.

A further object of the invention is to provide variable supercharging means by which the degree of precompression of the fuel charge may be increased with increased engine speed or at high altitudes.

A further object of the invention is to provide a two stage precompression mechanism in association with a four cycle engine.

A further object of the invention is to enable development of increased power, and engine speed, and more thorough and uniform intermixture of the fuel and air charge.

A further object of the invention is to provide a supercharging internal combustion engine having the advantageous structural features and inherent meritorious characteristics, and the mode of operation herein set forth.

With the above primary and other incidental objects in view as will more fully appear in the specification, the invention intended to be protected by Letters Patent consists of the features of construction, the parts and combination thereof, and the mode of operation, or their equivalents, as hereinafter described or illustrated in the accompanying drawing.

In the drawing,

Fig. 1 is a vertical sectional view of an internal combustion engine of the four cycle type embodying the present invention.

Fig. 2 is a detail view illustrating one form of speed controlled regulation of the fuel precompression means.

Like parts are indicated by similar characters of reference throughout the several views.

In the operation of hydrocarbon internal explosive engines at low speed, or when starting, the intake valve remains open for intake of fuel during a greater time interval, and a greater quantity of fuel gas enters the cylinder and is compressed to high degree upon the piston return before being ignited. However, the intake valve being timed with the speed of operation opens and closes more rapidly with increased engine speed, and remains open for intake of fuel during a less time interval. The flow of fuel gas being subject to engine suction during the lesser intake time interval, and its inertia being substantially unchanged, lesser quantity of fuel enters the engine cylinder and the density thereof being less, compression results upon the return stroke of the piston. To compensate for such fuel charge reduction and decreased compression, the fuel is introduced under pressure external of the engine cylinder, whereby more fuel may be caused to enter the cylinder during the shortened intake time interval incident to increased speed. A somewhat similar condition occurs in airplane motors when operating at high altitudes, where because of rarified air and less atmospheric pressure, the proper air and fuel mixture does not naturally occur, and the flow of the fuel mixture into the cylinder is retarded.

In the sequence of operation of a four cycle engine, the compressed fuel charge being ignited explodes and the piston descends on its power stroke delivering a power impulse to the crank shaft, and upon its return or scavenging stroke the exhaust valve opens and the spent products of combustion are discharged. Upon the succeeding down stroke the intake valve automatically opening, a new fuel charge is taken into the cylinder, in the present instance under a greater or less degree of precompression, whereby the quantity of fuel does not depend solely upon engine suction during the reduced intake period upon increase of the engine speed. The intake charge is compressed on the upstroke of the piston preparatory to the succeeding explosion and power stroke.

In the present instance, as hereafter described, the precompression of the fuel charge is distributed to not only minimize the resistance to the piston movement, but also to increase the volume of fuel mixture precompressed between charging operations. Upon the power stroke of the piston a preliminary charge of air and fuel previously drawn into the precompression chamber is compressed and forced into a storage or reservoir chamber. Upon the scavenging or products of combustion expelling stroke, a second charge of air and fuel is drawn into the precompression chamber, which upon the suction or fuel intake stroke of the piston is compressed and forced under pressure through the storage chamber or reservoir along with the previously compressed fuel charge into the engine cylinder while the intake valve remains open, preparatory to compression in the engine cylinder, during which stroke the next preliminary charge is drawn into the precompression chamber. Thus, each explosive charge received in the engine cylinder is subjected to two stages of precompression. In order that the degree of precompression of the succeeding charges may be varied with variation of engine speed, the precompression chamber is variable and means is provided to vary its capacity in accordance with fluctuations of engine speed.

Referring to the accompanying drawing, 1 indicates the cylinder of an explosive engine, of which 2 is the reciprocatory piston therein connected by a connecting rod 3 with a crank shaft 4. At the top of the cylinder 1 is an intake valve 5 and an exhaust valve 6. The intake and exhaust valves are operated in timed sequence with the reciprocation of the piston 2 and rotation of the crank shaft 4, by rocker members 7 which are actuated by thrust rods 8 from cam shafts 9 driven by gears 10 from the crank shaft. The construction so far described is that of a typical four cycle explosive engine which is here shown for illustrative purpose, but with no intent to limit or restrict the present invention to the particular type or style of engine in which the present invention may be embodied.

The piston 2 is connected with the connecting rod 3 by a tubular stem 10 which, to reduce the weight thereof, is preferably hollow. Surrounding the piston stem 10 in spaced relation beneath the piston head 2 is an auxiliary head 11, forming therebetween a precompression chamber 12. The auxiliary head 11 is axially adjustable within the lower part of the cylinder 1 to vary the capacity of the precompression chamber 12. Leading to the precompression chamber 12 is an intake passage 13, controlled by an intake valve 14 opened in proper sequence in the cycle of operation by a cam 15 operated by a gear 10a of the gear train 10.

At the opposite side of the chamber 12 is a discharge passage 16 leading to a storage reservoir 17, and controlled by a second cam 18 corresponding to the cam 15 and rotated under similar influence.

Upon the compression stroke of the piston 2 both on the stroke and the scavenging stroke, the valve 14 opens to admit a charge of air and fuel. The charge is placed under compression on the subsequent down stroke, and is forced past the valve 18 into the reservoir chamber 17. The first charge so compressed is momentarily held in the reservoir until the second compressed charge is admitted, whereupon the intake valve 5 opens and the double charge under compression in the reservoir chamber 17 is admitted to the engine cylinder where it is further compressed by movement of the piston 2 preparatory to explosion. The piston precompresses a charge of air and fuel on each down stroke and further compresses a double precompressed charge on every other upstroke.

The degree of compression to which succeeding incoming charges of air and fuel mixture are subjected may be varied by axial adjustment of the auxiliary head 11, whereby the capacity of the compression chamber 12 is reduced or enlarged. The auxiliary head 11 may be manually adjusted, or its adjustment may be automatically regulated by fluctuations of speed of the motor. Any suitable means may be employed for either the manual or automatic adjustment of the head 11.

As one means of adjustment, the head 11 may be provided with dependent toothed bars or fingers 19, the teeth of which engage in the threads of an internally threaded collar 20 surrounding the base of the cylinder 1 and revoluble relative thereto. As a means of rotating the collar to raise or lower the auxiliary head, the collar may be provided with marginal rack teeth engaging with a rotary pinion 21. The latter may be rotated manually by a crank, or may be operated by the fluctuation of a speed governor mechanism 22—23, as illustrated in Fig. 2.

While for illustrative purposes the invention has been shown embodied in a conventional form of engine structure embodying puppet valves for control of the precompressed fuel charges as well as the intake and exhaust valves to the engine explosive chamber, it is to be understood that the invention is not limited to the particular construction and arrangement shown, but may be applied to other types of explosive engines and that other forms of fuel control valves, including sleeve valves, rotary valves, or slide valves may be employed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An internal combustion engine, wherein a reciprocatory piston within a cylinder successively draws a fuel charge into the cylinder, compresses the charge, imparts a power stroke to a crank shaft upon explosion of the compressed charge and ejects the spent products of combustion preparatory to repetition of the cycle of operation, including an adjustable auxiliary head in said cylinder approached by the piston upon the intake and power strokes, a precompression chamber of variable capacity in the cylinder intermediate the piston and auxiliary head, a valved fuel intake passage leading thereto, a storage reservoir for fuel under compression, a valved discharge passage for precompressed fuel from the precompression chamber to the reservoir, a valved passage from the reservoir to the cylinder, and valve operating devices for opening and closing the valved passages in timed sequence, the construction and arrangement being such that successive fuel charges are precompressed by the approach of the piston toward the auxiliary head during the power stroke and fuel intake stroke thereof and admitted under pressure through the reservoir to the cylinder only during the fuel intake stroke.

2. An internal combustion engine, wherein a reciprocatory piston within a cylinder successively draws a fuel charge into the cylinder, compresses the charge, imparts a power stroke to a crank shaft upon explosion of the compressed charge and ejects the spent products of combustion preparatory to repetition of the cycle of operation, including an auxiliary head in said cylinder approached by the piston upon the intake and power strokes, a precompression chamber in the cylinder intermediate the piston and auxiliary head, a valved fuel intake passage leading thereto, a storage reservoir for fuel under compression, a valved discharge passage for precompressed fuel from the precompression chamber to the reservoir, a valved passage from the reservoir to the cylinder, and valve operating devices for opening and closing the valved passages in timed sequence, the construction and arrangement being such that successive fuel charges are precompressed by the approach of the piston toward the auxiliary head during the power stroke and fuel intake stroke thereof and admitted under pressure through the reservoir to the cylinder only during the fuel intake stroke, and means for automatically varying the capacity of the precompression chamber and the degree of compression of the fuel charges.

3. An internal combustion engine, wherein a reciprocatory piston within a cylinder successively draws a fuel charge into the cylinder, compresses the charge, imparts a power stroke to a crank shaft upon explosion of the compressed charge and ejects the spent products of combustion preparatory to repetition of the cycle of operation, including an auxiliary head in said cylinder approached by the piston upon the intake and power strokes, a precompression chamber in the cylinder intermediate the piston and auxiliary head, a valved fuel intake passage leading thereto, a storage reservoir for fuel under compression, a valved discharge passage for precompressed fuel from the precompression chamber to the reservoir, a valved passage from the reservoir to the cylinder, and valve operating devices for opening and closing the valved passages in timed sequence, the construction and arrangement being such that successive fuel charges are precompressed by the approach of the piston toward the auxiliary head during the power stroke and fuel intake stroke thereof and admitted under pressure through the reservoir to the cylinder only during the fuel intake stroke, and means for automatically varying the capacity of the precompression chamber and the degree of compression of the fuel charges in accordance with fluctuations of engine speed.

4. An explosive engine, including a cylinder, a piston and an explosion chamber, a variable precompression chamber pertaining to the explosion chamber for precompressing plural fuel charges prior to their admission to the explosion chamber, and valve means for controlling the admission of fuel to the precompression chamber, and the simultaneous admission of plural precompressed charges to the explosion chamber.

5. An explosive engine, including a cylinder, a piston therein, an axially adjustable auxiliary head within the chamber approached by the piston on its retrograde strokes, a precompression chamber between the auxiliary head and the piston wherein successive portions of a single intake charge of fuel to the cylinder are precompressed, valve means controlling the successive admission of fuel portions to the precompression chamber and the admission of the compressed charge to the engine cylinder, and means for automatically adjusting the axially adjustable head in response to changes of engine speed.

6. An explosive engine, including a cylinder having spaced relatively adjustable heads, a piston reciprocating between the heads, an intake passage for fuel to the cylinder at one side of the piston through which fuel charges are admitted during each stroke of the piston in one direction and compressed during each stroke of the piston in the opposite direction, and a passage through which double charges of precompressed fuel are by-passed from the cylinder at one side of the piston to the cylinder at the opposite side thereof during alternate strokes of the piston in one direction and compressed therein during alternate strokes of the piston in the opposite direction, and valve means regulating the passage of the fuel changes.

7. An explosive engine of the type wherein a reciprocatory piston is disposed in a cylinder intermediate relatively spaced heads thereof and forming a precompression chamber within the cylinder at one side of the piston and an explosion chamber therein at the opposite side of the piston, and wherein a fuel supply passage leads from a source of supply to the precompression chamber to the explosion chamber, characterized by valves controlling the passages, the intake passage to admit fuel charges to the precompression chamber intermediate succeeding operations of the valve controlling discharge passage of the precompressed fuel therefrom into the explosion chamber in continuous sequence, the construction and arrangement being such that successive charges of fuel are admitted and separately precompressed intermediate the piston and one cylinder head into a single charge subsequently admitted to the portion of the cylinder intermediate the piston and the other cylinder head, and adjusting means for varying the capacity of the precompression chamber.

8. The herein described method of explosive engine operation, including precompressing plural fuel charges, and subsequently simultaneously admitting the plural precompressed fuel charges to the engine cylinder in a single explosive charge, and automatically varying the degree of precompression of the plural fuel charges in accordance with the engine speed.

9. The herein described method of explosive engine operation, including the steps of precompressing successive partial fuel charges automatically varying the degree of compression thereof in accordance with fluctuations of engine speed, combining the precompressed partial charges, and admitting the combined precompressed partial charges to the engine as a single complete precompressed charge.

10. The herein described method of explosive engine operation, including the steps of subjecting each complete fuel charge to successive precompression operations before admission to the engine cylinder, and automatically varying the degree of precompression thereof to compensate for changes of engine speed.

11. An explosive engine, wherein a piston reciprocates within a cylinder, including an auxiliary adjustable head in the cylinder approached by the cylinder upon each retrograde movement thereof, a precompression chamber between the piston and the auxiliary head within which incoming charges of fuel are precompressed prior to admission to the cylinder, and means for automatically axially adjusting the auxiliary head to vary the capacity of the precompression chamber and consequently the degree of precompression of the fuel.

12. An explosive engine, wherein a piston reciprocates within a cylinder, including an auxiliary adjustable head in the piston approached by the cylinder upon each retrograde movement thereof, a precompression chamber between the piston and the auxiliary head within which incoming charges of fuel are precompressed prior to admission to the cylinder, and a speed controlled adjuster for automatically adjusting the auxiliary head to vary the degree of precompression of the fuel in accordance with fluctuation of the engine speed.

13. An explosive engine, including a cylinder, a fixed head and a relatively spaced adjustable head for the cylinder, a piston head reciprocating within the cylinder between the fixed head and the adjustable head, an explosion chamber between the piston head and the fixed head of the cylinder, a precompression chamber between the piston head and the adjustable cylinder head to which successive fuel charges are admitted and precompressed therein intermediate the admission of the precompressed fuel to the explosion chamber, a by-pass for the precompressed fuel from the precompression chamber to the explosion chamber, including a storage space for temporary detention of the precompressed fuel prior to its admission to the explosion chamber.

14. The herein described method of explosive engine operation, including precompressing plural partial fuel charges, simultaneously admitting to the explosion chamber of the engine plural precompressed partial charges of fuel, and varying the degree of precompression of the partial charges of fuel to compensate for fluctuations of engine speed.

15. An explosive engine, including an explosion chamber and a precompression chamber of variable capacity, adjusting means for varying the capacity thereof and hence the degree of precompression of the fuel, a reciprocatory piston common to the explosion and precompression chambers for separately precompressing plural fuel charges to variable degree in the precompression chamber by successive movement in one direction and further collectively compressing the plural precompressed fuel charges in the explosion chamber preparatory to explosion thereof by a single movement of the piston in the opposite direction.

16. An explosive engine, including a cylinder, a piston therein, a precompression chamber to which partial charges of fuel are successively admitted, and wherein they are precompressed, a passage for precompressed fuel from the precompression chamber to the cylinder through which successive precompressed charges of fuel are simultaneously admitted to the cylinder as a single explosive charge, and adjusting means for varying the degree of precompression of the fuel to compensate for fluctuations of engine speed.

17. The herein described method of explosive engine operation, including the steps of precompressing plural partial charges of fuel to a variable degree, proportioning the degree of compression thereof to the operating conditions of the engine and conjointly admitting the plural precompressed charges of fuel to the engine cylinder and conjointly compressing them therein as a single explosive charge.

18. The herein described method of explosive engine operation, including intaking and precompressing successive partial charges of fuel at each stroke of the engine piston, automatically varying the degree of precombustion thereof and subsequently transferring to the explosion chamber, and compressing plural previously precompressed charges of fuel therein at every other stroke of the engine piston.

19. The herein described method of explosive engine operation, including the steps of precompressing the engine fuel in separate successive partial charges to variable degree of precompression, and regulating the degree of precompression in accordance with fluctuations of engine speed and subsequently conjointly further compressing the previously precompressed partial charges as a single charge preparatory to explosion thereof.

WALTER L. BARTHELEMY.

CERTIFICATE OF CORRECTION.

Patent No. 2,354,357. July 25, 1944.

WALTER L. BARTHELEMY.

It is hereby certified that error appears in the printed specification of the above numbered patent requiring correction as follows: Page 4, second column, line 50, claim 18, for the word "precombustion" read --precompression--; and that the said Letters Patent should be read with this correction therein that the same may conform to the record of the case in the Patent Office.

Signed and sealed this 26th day of September, A. D. 1944.

(Seal)

Leslie Frazer
Acting Commissioner of Patents.